(12) United States Patent
Zimmer

(10) Patent No.: US 7,103,529 B2
(45) Date of Patent: Sep. 5, 2006

(54) METHOD FOR PROVIDING SYSTEM INTEGRITY AND LEGACY ENVIRONMENT EMULATION

(75) Inventor: Vincent J. Zimmer, Federal Way, WA (US)

(73) Assignee: Intel Corporation, Santa Clara, CA (US)

( * ) Notice: Subject to any disclaimer, the term of this patent is extended or adjusted under 35 U.S.C. 154(b) by 733 days.

(21) Appl. No.: 09/966,015

(22) Filed: Sep. 27, 2001

(65) Prior Publication Data

US 2003/0061497 A1 Mar. 27, 2003

(51) Int. Cl.
G06F 9/455 (2006.01)
G06F 11/30 (2006.01)

(52) U.S. Cl. .............. 703/27; 703/24; 713/2; 713/187

(58) Field of Classification Search ............ 703/27, 703/24; 713/2, 200, 201, 187; 702/186
See application file for complete search history.

(56) References Cited

U.S. PATENT DOCUMENTS

| | | | | |
|---|---|---|---|---|
| 4,787,031 | A * | 11/1988 | Karger et al. ............ 718/100 |
| 5,522,075 | A * | 5/1996 | Robinson et al. .......... 718/100 |
| 5,721,922 | A * | 2/1998 | Dingwall .................. 718/103 |
| 5,781,755 | A * | 7/1998 | Uchino .................... 718/100 |
| 5,844,986 | A * | 12/1998 | Davis ..................... 713/187 |
| 6,075,938 | A | 6/2000 | Bugnion et al. |
| 6,199,181 | B1 * | 3/2001 | Rechef et al. ............ 714/38 |
| 6,321,323 | B1 * | 11/2001 | Nugroho et al. .......... 712/34 |
| 6,397,242 | B1 * | 5/2002 | Devine et al. ............ 718/1 |
| 6,496,847 | B1 * | 12/2002 | Bugnion et al. .......... 718/1 |
| 6,609,199 | B1 * | 8/2003 | DeTreville ............... 713/172 |
| 2002/0143842 | A1 * | 10/2002 | Cota-Robles et al. ...... 709/1 |
| 2002/0169987 | A1 * | 11/2002 | Meushaw et al. ......... 713/201 |
| 2003/0120856 | A1 * | 6/2003 | Neiger et al. ............ 711/6 |
| 2004/0044880 | A1 * | 3/2004 | Altman et al. ........... 712/209 |

FOREIGN PATENT DOCUMENTS

WO WO 02/052404 A2 7/2002

OTHER PUBLICATIONS

Microsoft Computer Dictionary, 2002, Microsoft Press, Fifth Edition, pp. 7, 8, 159, 160, 429, 440, 577.*
Arbaugh et al., A Secure and Reliable Bootstrap Architecture, 1997, 1997 IEEE Symposium on Security and Privacy, pp. 65-71.*
Intel Corporation, "Extensible Firmware Interface Specification", Dec. 2000, pp. i-v and 1-24.*
Michael Kinney and Curtis E. Stevens, "EFI 1.1", Aug. 2000, Intel Corporation, pp. 1-83.*

(Continued)

*Primary Examiner*—Paul L. Rodriguez
*Assistant Examiner*—Jason Proctor
(74) *Attorney, Agent, or Firm*—Blakely, Sokoloff, Taylor & Zafman LLP

(57) ABSTRACT

A method and apparatus to provide pre-boot security and legacy hardware and environment support for a computing system having an extensible firmware architecture is described. A virtual machine monitor is employed to provide the virtualization of system state for the purposes of running legacy compatibility code or protecting key data and code regions for safety and security. An application may be given access to a subset of the system resources, and access to portions of the memory map not designated for updates would trap (program interrupt) to the VMM. A VMM pre-boot policy agent may then protect state and unload any problematic software.

10 Claims, 4 Drawing Sheets

OTHER PUBLICATIONS

Paul Parenteau, "Extensible Firmware Interface—Changing the face of BIOS", Mar. 2001, Intel Corporation, pp. 1-23.*

Popek, et al., "Formal Requirements for Virtualizable Third Generation Architectures", Communications of the ACM, vol. 16, No. 7, Jul. 1974, pp. 412-421.

Souder, et al., "A Tool for Securley Integrating Legacy Systems into a Distributed Environment", Reverse Engineering, 1999, pp. 47-55.

Ebicoglu, K. et al., "IBM Research Report—DAISY: Dynamic Compilation for 100% Architectural Compatibility," Computer Science, May 8, 1996. http://citeseer.ist.psu.edu/2006.html.

Brackin, S. H., "An Interface Specification Language for Automatically Analyzing Cryptographic Protocols," Proceedings., 1997 Symposium on San Diego, CA, USA, Feb. 10-11, 1997, pp. 40-51.

Devanbu, P. T. et al., "Techniques for Trusted Software Engineering," Proceedings of the 1998 International Conference on Kyoto, Japan, Apr. 19-25, 1998, pp. 126-135.

Ebcioglu, K. et al., "An Eight-Issue Tree-VLIW Processor for Dynamic Binary Translation," Sep. 16, 1998. http://www.research.ibm.com/vliw/isca31/An%20eight-issue%20tree-VLIW%20processor%20for%20dynamic%20binary%20translation.pdf.

Robin, J. S. et al., "Analysis of the Intel Pentium's Ability to Support a Secure Virtual Machine Monitor," Jun. 11, 2000. http://citeseer.ist.psu.edu/robin00analysis.html.

* cited by examiner

METHOD FOR PROVIDING SYSTEM INTEGRITY AND LEGACY ENVIRONMENT EMULATION

FIELD OF THE INVENTION

This invention relates generally to computing systems having extensible firmware architecture and more specifically to the use of a virtual machine monitor (VMM) to emulate legacy hardware and environment and provide protected storage and execution in a computing system having an extensible firmware architecture.

BACKGROUND OF THE INVENTION

A recent development in computer system firmware is an extensible firmware interface (EFI) framework that allows software vendors to develop operating systems programs that can be used with a variety of central processing units (CPUs). An application binary interface (ABI) is included that specifies how to pass data on the stack for a given CPU type. By abstracting the platform, the framework provides many advantages over systems employing legacy architecture. As this concept of component architecture progresses, system architecture is emerging that uses ABIs and software abstraction throughout the entire system initialization process. This includes not only CPU initialization, but chipset and I/O device initialization as well. A software framework is provided that allows multiple parties to write small pieces of code that abstract how portions of the chip set or I/O complex work. Within such a framework, products from various vendors will interoperate. The pieces of code from each vendor are contained in initialization modules. During a system initialization phase (after CPU reset, but prior to memory initialization) core initialization code dispatches the initialization modules in a sequenced order to provide basic services. The initialization phase initializes enough of the system to enable follow-on phases, for example, the driver execution phase that is responsible for initialization processes that are algorithmically more complex such as scanning I/O busses, enumerating resources and installing drivers.

This concept of allowing contributions of drivers and applications from multiple parties raises several concerns. The security of system firmware, provided by a single vendor, is implicit from the vendor. The incorporation of code modules from various sources imperils system integrity as there is no provision to either sandbox or validate the code. The EFI platform executes in physical mode. Execution in physical mode means that all addresses correspond to actual memory locations. Although execution in physical mode provides the OS loaders with full access to all platform resources, it also precludes the use of virtual memory page tables and the protection they provide in the preboot. Since boot firmware has full machine access, sensitive data structure and code of the core EFI are subject to corruption through access by drivers and applications. Techniques, such as code signing, to validate the source of drivers and applications, cannot guarantee fault isolation when the system state has been corrupted by bad code.

Another difficulty is legacy code support. For many years software has been written to be compatible with the PC/AT platform. Many legacy operating systems and option ROMs require PC/AT memory-mapped hardware/software. This legacy code executes in Real Mode that limits the processor to 1 Mb of memory and provides no memory management or memory protection features.

BRIEF DESCRIPTION OF THE DRAWINGS

The present invention is illustrated by way of example and not intended to be limited by the figures of the accompanying drawings in which like references indicate similar elements and in which.

DETAILED DESCRIPTION

Figure 1:
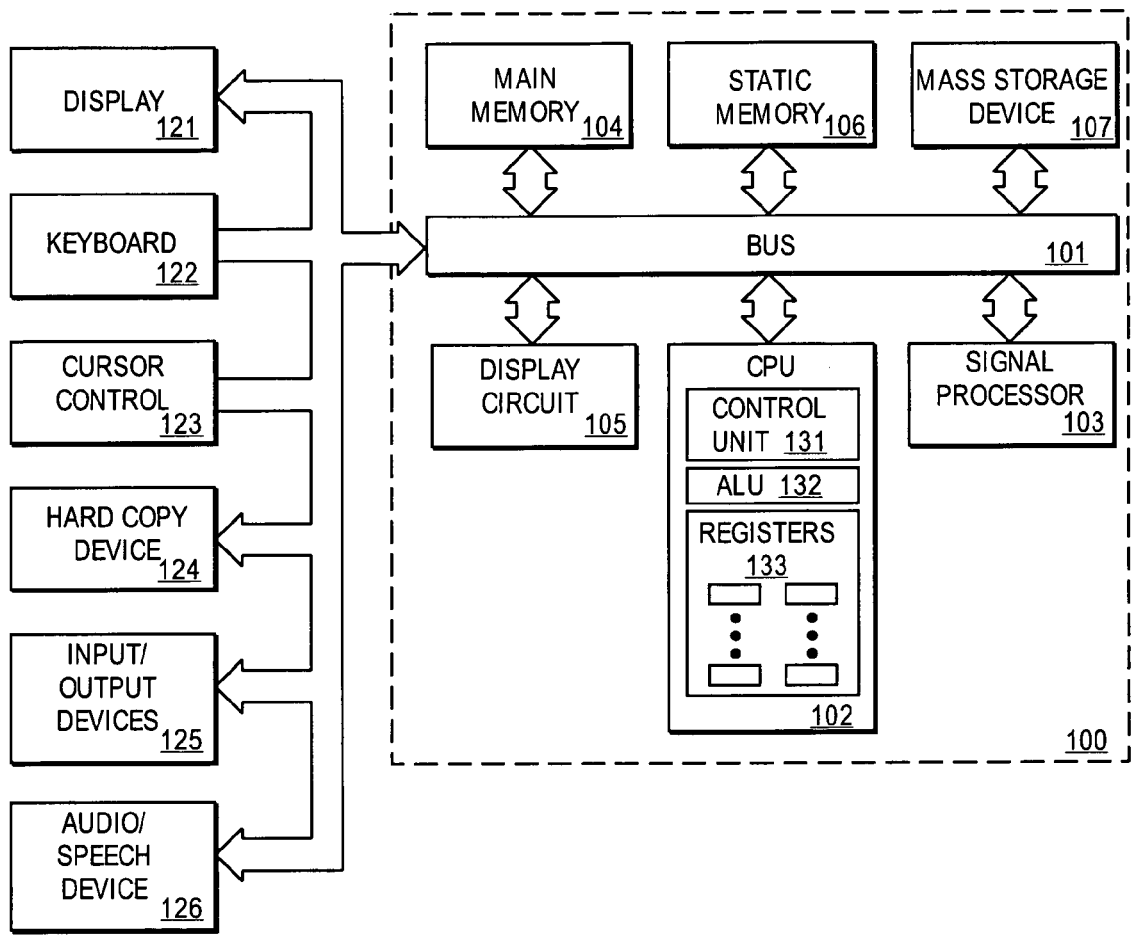
FIG. 1 is a diagram illustrating an exemplary computing system 100 for implementing the VMM of the present invention.

The present invention provides, in one embodiment, methods and apparatuses to provide the virtualization of system state for the purposes of running legacy compatibility code or protecting key data and code regions for safety and security.

A VMM is simulator software that provides an efficient replica of the original machine including all of the CPU instructions and system resources (e.g., memory and I/O devices). In one embodiment the VMM is used to maintain a pre-boot security and integrity policy for a component based architecture platform.

A virtual machine monitor (VMM) is employed to emulate legacy hardware and environment to provide legacy code support. The VMM allows code that is ostensibly privileged (e.g., BIOS code) to be emulated and run without the code realizing its being emulated.

In the driver execution phase, a driver may be loaded that installs a VMM. Legacy applications (e.g., a legacy OS loader) may then be run within the VMM. In one embodiment the VMM is only loaded if a boot variable is set to indicate that a legacy OS may be booted. The use of a VMM may aid in protecting memory and system structures from application perturbation. The application can be given access to a subset of the system resources, and access to portions of the memory map not designated for updates would trap (program interrupt) to the VMM. A VMM pre-boot policy agent may then protect state and unload any problematic software. The VMM transparently publishes an environment that appears to be the physical mode environment but has safeguards against illegal behavior; it may even map memory such that software sees the legacy memory map below one-megabyte for systems that do not actually decode this physical address range. This transparency maintains compatibility with legacy PC/AT BIOS modules, option ROM's, EFI drivers, and applications.

In one embodiment the present invention virtualizes the entire PC/AT environment to provide support for legacy OSs and legacy hardware such as the 82XX series: timer counter, serial port, and master/slave interrupt controller. The VM allows a system having an extensible firmware architecture to facilitate pre-boot option ROMs or a run-time environments that don't use its native interfaces. For example, the VM emulates the PC/AT environment allowing a legacy option ROM to run and effect its I/O services. The VMM then translates the results into a native API. That is, the VMM traps the I/O to the semantic equivalent in the native environment.

In an alternative embodiment a VMM may be used to emulate a native 32-bit/64-bit environment to provide protected storage and protected execution to a platform executing in physical mode. The EFI system architecture doesn't allow for page tables and read-only designations for specified pages because the OS loader may be using the page tables to bootstrap the OS kernel. Use of the VMM provides a way to get under the OS loader to generate and store security-related information to which the bulk of driver and application code has no access.

FIG. 1 is a diagram illustrating an exemplary computing system 100 for implementing the VMM of the present invention. The virtualization of system state for the purposes of running legacy compatible code or protecting key data and code regions for safety and security described herein can be implemented and utilized within computing system 100, which can represent a general-purpose computer, portable computer, or other like device. The components of computing system 100 are exemplary in which one or more components can be omitted or added. For example, one or more memory devices can be utilized for computing system 100.

Referring to FIG. 1, computing system 100 includes a central processing unit 102 and a signal processor 103 coupled to a display circuit 105, main memory 104, static memory 106, and mass storage device 107 via bus 101. Computing system 100 can also be coupled to a display 121, keypad input 122, cursor control 123, hard copy device 124, input/output (I/O) devices 125, and audio/speech device 126 via bus 101.

Bus 101 is a standard system bus for communicating information and signals. CPU 102 and signal processor 103 are processing units for computing system 100. CPU 102 or signal processor 103 or both can be used to process information and/or signals for computing system 100. CPU 102 includes a control unit 131, an arithmetic logic unit (ALU) 132, and several registers 133, which are used to process information and signals. Signal processor 103 can also include similar components as CPU 102.

Main memory 104 can be, e.g., a random access memory (RAM) or some other dynamic storage device, for storing information or instructions (program code), which are used by CPU 102 or signal processor 103. Main memory 104 may store temporary variables or other intermediate information during execution of instructions by CPU 102 or signal processor 103. Static memory 106, can be, e.g., a read only memory (ROM) and/or other static storage devices, for storing information or instructions, which can also be used by CPU 102 or signal processor 103. Mass storage device 107 can be, e.g., a hard or floppy disk drive or optical disk drive, for storing information or instructions for computing system 100.

Display 121 can be, e.g., a cathode ray tube (CRT) or liquid crystal display (LCD). Display device 121 displays information or graphics to a user. Computing system 100 can interface with display 121 via display circuit 105. Keypad input 122 is an alphanumeric input device with an analog to digital converter. Cursor control 123 can be, e.g., a mouse, a trackball, or cursor direction keys, for controlling movement of an object on display 121. Hard copy device 124 can be, e.g., a laser printer, for printing information on paper, film, or some other like medium. A number of input/output devices 125 can be coupled to computing system 100. The emulation of a legacy environment to support legacy operating systems and legacy option ROMs and the emulation of a physical mode environment to provide protected execution and storage in accordance with the present invention can be implemented by hardware and/or software contained within computing system 100. For example, CPU 102 or signal processor 103 can execute code or instructions stored in a machine-readable medium, e.g., main memory 104.

The machine-readable medium may include a mechanism that provides (i.e., stores and/or transmits) information in a form readable by a machine such as computer or digital processing device. For example, a machine-readable medium may include a read only memory (ROM), random access memory (RAM), magnetic disk storage media, optical storage media, flash memory devices. The code or instructions may be represented by carrier-wave signals, infrared signals, digital signals, and by other like signals.

Figure 2:
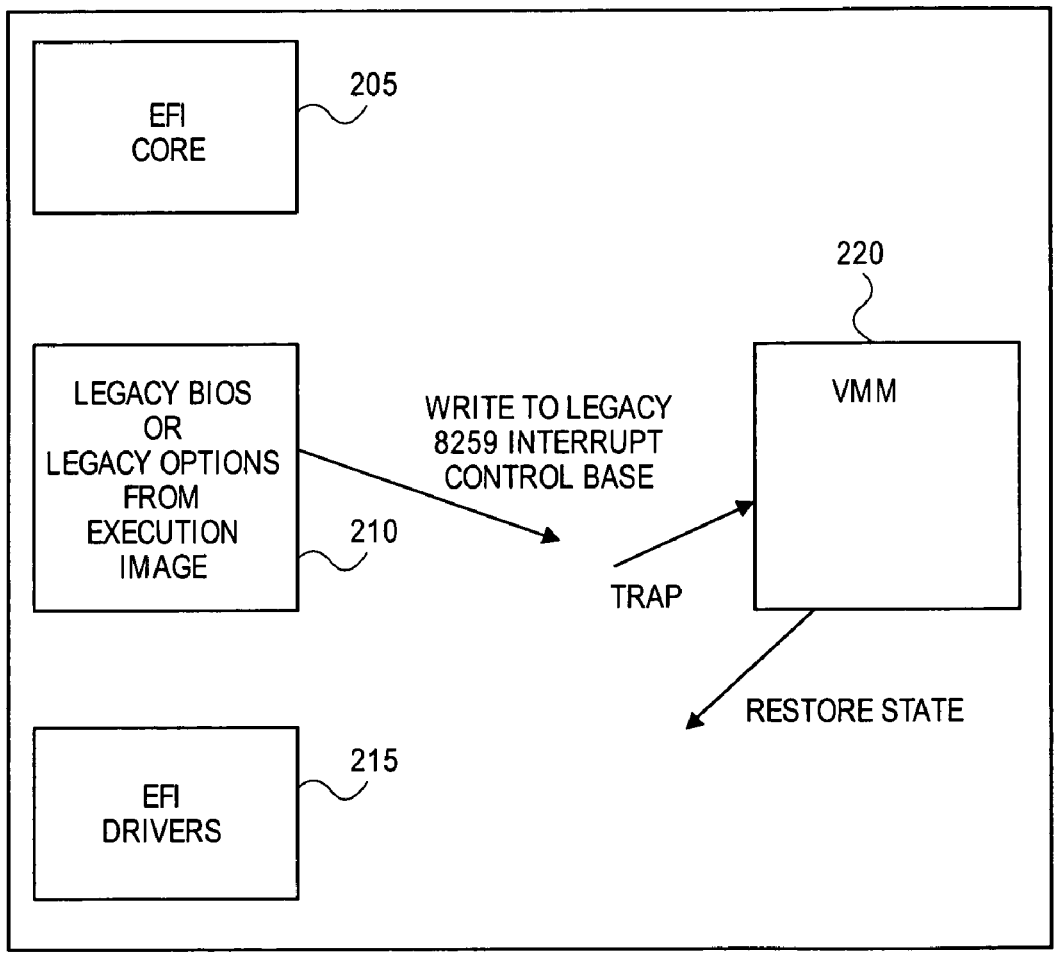
FIG. 2 illustrates legacy emulation in accordance with one embodiment of the present invention.

FIG. 2 illustrates legacy emulation in accordance with one embodiment of the present invention. Typically, a personal computer motherboard will support legacy 8259 interrupt controllers even though only the legacy option ROM's presuppose their existence; modern operating systems use APIC (IA32) or SAPIC (IPF) for their interrupt support, thus leaving motherboard hardware like paired 8259's usable during a few seconds of machine boot.

System 200, shown in FIG. 2, includes EFI core 205, a legacy execution image 210, EFI drivers 215, and VMM 220. Legacy execution image 210 may be a pre-boot option ROM or run-time environment that does not use the native EFI interfaces. Upon a write to a legacy 8259 interrupt control base from legacy execution image 210, for example, the instruction is trapped to the VMM 220. The VMM 220 can trap any instruction that touches the system state (e.g., interrupt flag) or changes protection. If the system is executing in legacy mode, the VMM 220 maps access to the legacy interrupt (PIC) mask to the associated native interrupt control register. For example, the system may attempt access to a legacy hardware not included. The VMM can trap the I/O to the semantic equivalent in the native environment. At this point one of the EFI drivers 215 may communicate with the relevant chipset register and provide the result to the virtual machine. This provides a migration path from the legacy environment.

A VMM may be used to provide pre-boot security by sandboxing programs from third parties. Running a program in sandbox mode prevents the program from having access to the rest of the system. The code can be trusted, as it cannot harm the rest of the system. The application can be given access to a subset of the system resources, and access to portions of the memory map not designated for updates would trap to the VMM. A VMM pre-boot policy agent may then protect state and unload problematic software.

Figure 3:
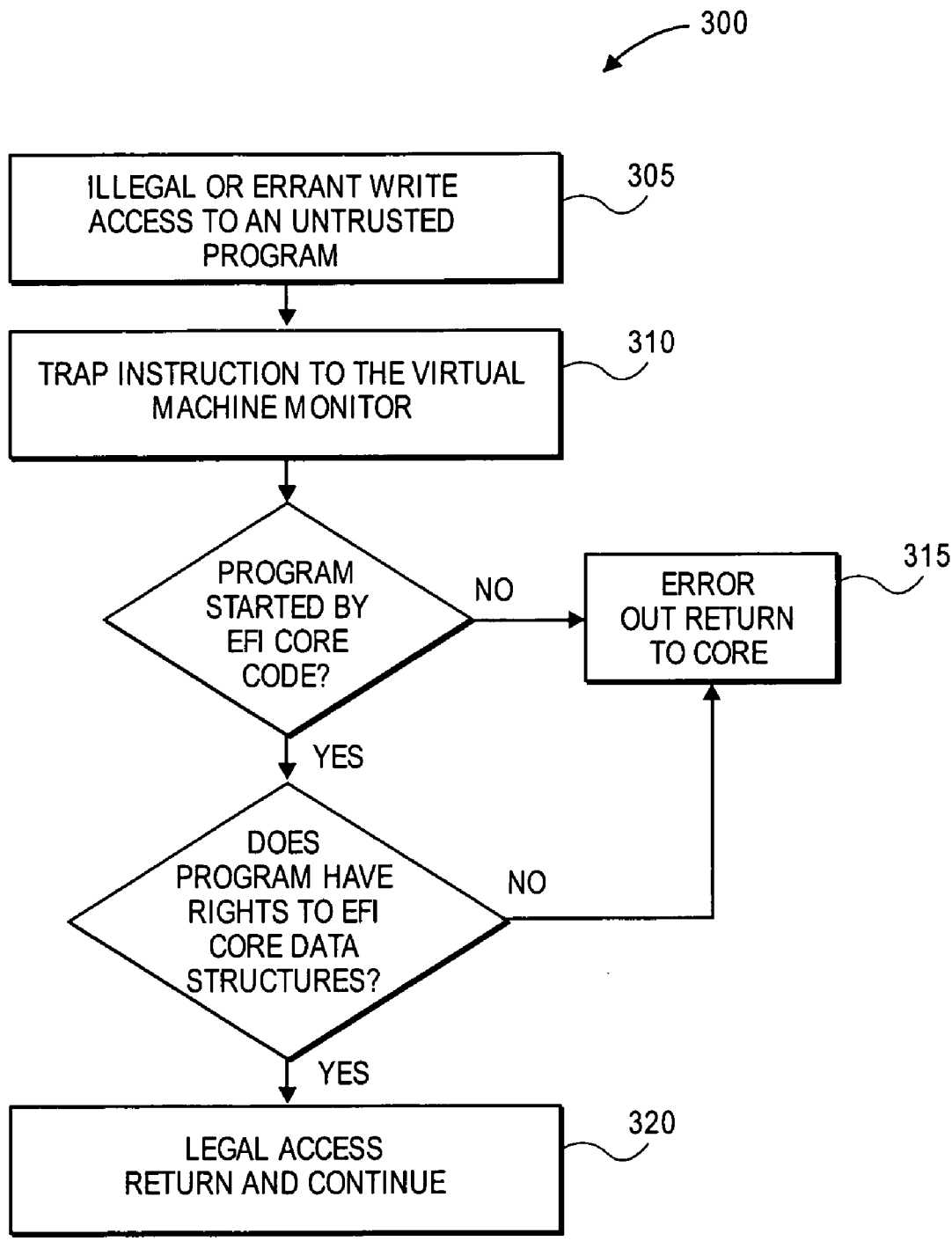
FIG. 3 is a process flow diagram depicting the VMM operation to sandbox an untrusted program in accordance with one embodiment of the present invention.

FIG. 3 is a process flow diagram depicting the VMM operation to sandbox an untrusted program in accordance with one embodiment of the present invention. Process 300, shown in FIG. 3, begins with operation 305 in which an untrusted program attempts an illegal write access. At operation 310 the instruction is trapped to the VMM. If the program is started by EFI core code and if the program has access to the EFI core data structures then access is legal. If not, access is denied at operation 320 and control is returned to the core.

In one embodiment the VMM may sandbox the state that code introduced from adapter cards and via third-party drivers could corrupt. The small code footprint of such a software technique is advantageous for cost-sensitive, flash memory based systems.

The VMM executes in privileged mode and emulates privileged mode to execute the EFI environment up to the OS load. Since the VMM abstracts this less privileged code, the VMM can hide portions of the address space. The protected storage and execution that virtualizing protected mode allows becomes part of a security infrastructure.

Figure 4:
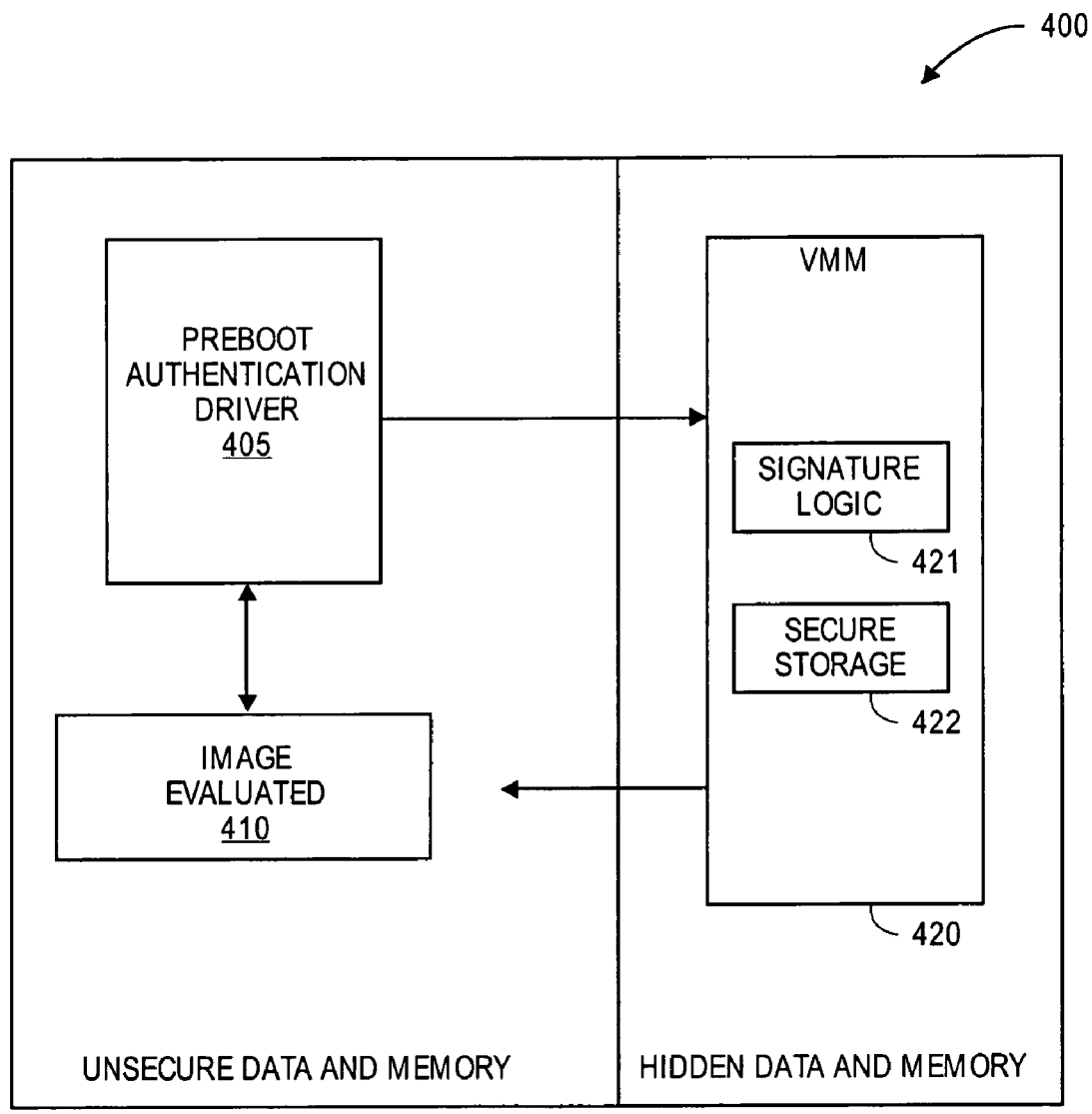
FIG. 4 depicts the implementation of a security application through use of a VMM in accordance with one embodiment.

FIG. 4 depicts the implementation of a security application through use of a VMM in accordance with one embodiment of the present invention. System 400, shown in FIG. 4, includes a preboot authentication driver 405 that evaluates a module 410. The module 410 may contain a digital signature from the vendor. The signature may be a MD5 or SHA-1 signature. The preboot authentication driver 405 may call an entry point to the signature logic 421 of VMM 420 to validate the signature. The VMM 420 provides secure storage 422 that may contain the signatures of valid drivers and modules in an attestation log. The attestation log may contain the signatures of code that the system has loaded. If so, the VMM will validate the code, that is, the platform is attesting to having run the code. This provides assurance to the OS, prior to taking control, that the code can be trusted.

Thus, the VMM provides pre-boot security (i.e., the APIs and framework) to implement a trusted platform up to and including OS loading. At this point the OS loader can provide its own security.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A machine-readable medium that provides executable firmware instructions which, when executed by a processor in a computer system having a native environment that executes in physical mode, cause the processor to perform operations comprising:

implementing an extensible firmware framework via which firmware modules are loaded during a pre-boot phase of a computer system;

implementing a firmware-based virtual machine monitor (VMM) upon the computing system;

emulating legacy hardware components that are not present in the native environment using the VMM to provide support for legacy code running on the computer system;

restricting access by the firmware modules to a subset of system resources provided by the native environment and to a subset of a memory map of the native environment, via the VMM; and authenticating, via the VMM, at least one of the firmware modules that is loaded during the pre-boot phase by comparing a digital signature provided with the at least one of the firmware modules with valid digital signatures stored in a secure storage that is accessible to the VMM, but which the VMM makes inaccessible to the firmware modules and the legacy code.

2. The machine-readable medium of claim 1, wherein the VMM provides at least one of PC/AT hardware emulation and PC/AT environment emulation.

3. The machine-readable medium of claim 1, wherein execution of the instructions cause further operations to be performed, comprising:

unloading one of the firmware modules that attempts to access a restricted one of the system resources or a restricted portion of the memory map.

4. The machine-readable medium of claim 1, wherein authenticating, via the VMM, the at least one of the firmware modules that is loaded during the pre-boot phase further comprises:

calling signature logic of the VMM;

comparing the digital signature provided with the at least one of the firmware modules against the valid digital signatures stored in the secure storage by the signature logic to authenticate the at least one of the firmware modules; and loading the at least one of the firmware modules, only if the at least one of the firmware modules is authenticated by the signature logic.

5. The machine-readable medium of claim 4, wherein authenticating, via the VMM, the at least one of the firmware modules that is loaded during the pre-boot phase further comprises:

maintaining an attestation log via the VMM identifying firmware modules that have been loaded and authenticated by the signature logic.

6. An apparatus comprising:

a computing system having a native execution environment that executes in physical mode, the computer system including an extensible firmware framework via which firmware modules are loaded during a pre-boot phase of the computer system; and a virtual machine monitor ("VMM") implemented thereon, the VMM emulating legacy hardware components that are not present in the native environment to provide support for legacy code to run on the computer system, the VMM restricting access by the firmware modules to a subset of system resources provided by the native environment and to a subset of a memory map of the native environment, the VMM further authenticating the firmware modules loaded during the pre-boot phase by comparing the digital signatures provided with the firmware modules with valid digital signatures stored in secure storage accessible to the VMM, but which the VMM makes inaccessible to the firmware modules.

7. The apparatus of claim 6, wherein the VMM provides at least one of PC/AT hardware emulation and PC/AT environment emulation.

8. The apparatus of claim 6, wherein the VMM performs further operations, including:

enabling a legacy option ROM (read-only memory) to run and effect its input/output (I/O) services;

trapping calls to legacy interrupts by the VMM; and mapping the calls to legacy interrupts to corresponding native environment interrupts by the VMM.

9. A method, comprising:

implementing an extensible firmware framework via which firmware modules are loaded during a pre-boot phase of a computer system;

implementing a virtual machine monitor (VMM) during the pre-boot phase of a computer system;

storing digital signatures of valid firmware modules in secure storage accessible to the VMM, but which the VMM makes inaccessible to other code running on a computer system; and authenticating a firmware module via the VMM by comparing a digital signature provided with the firmware module to the digital signatures in the secure storage.

10. The method of claim 9, further comprising:

maintaining an attestation log via the VMM identifying firmware modules that have been loaded and authenticated by the VMM.

\* \* \* \* \*